Figure 1:
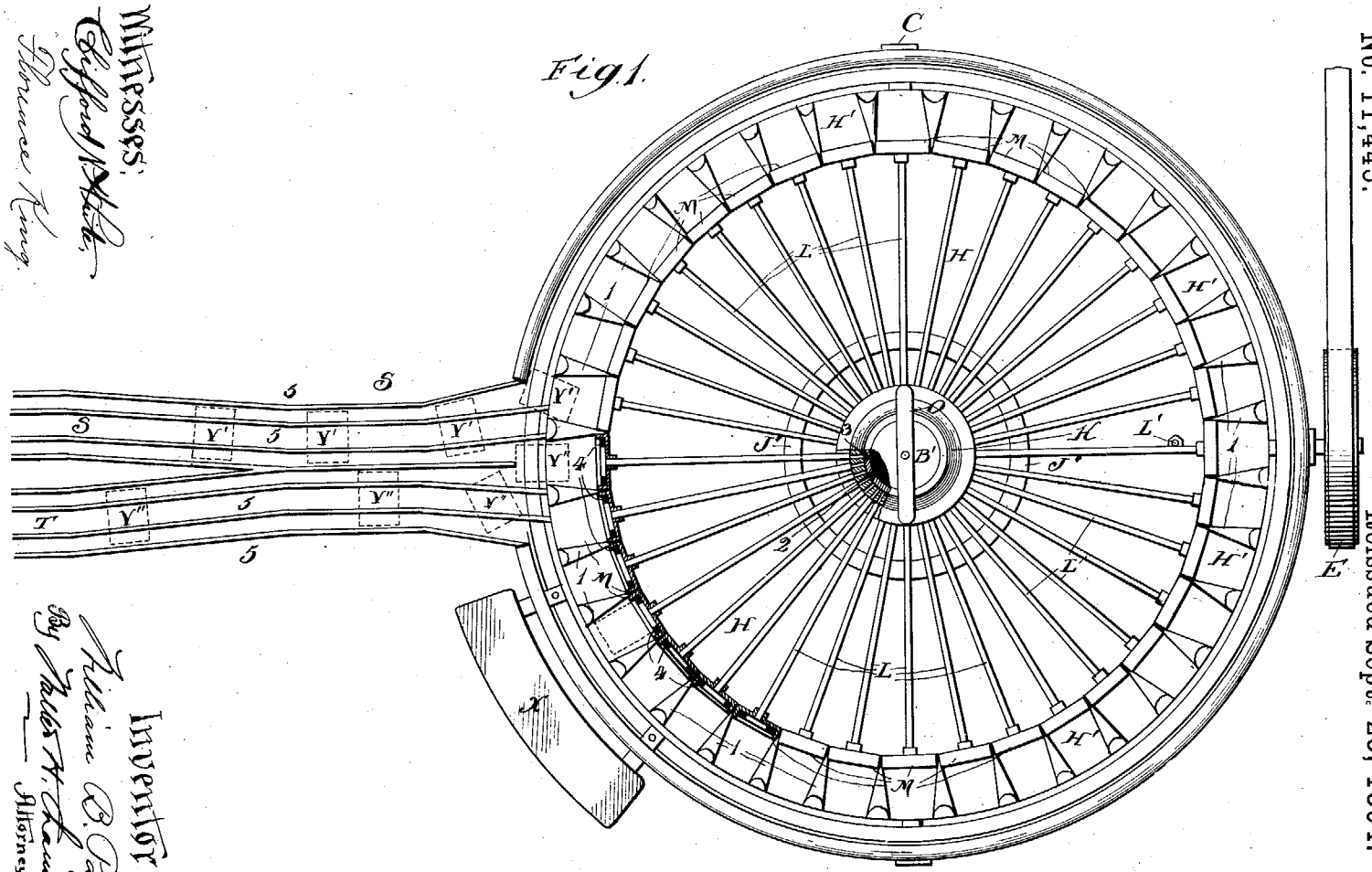

2 Sheets—Sheet 1.

W. B. PAGE.

PNEUMATIC TESTER FOR CANS.

No. 11,443. Reissued Sept. 25, 1894.

Witnesses:
Clifford N. White,
Florence King.

Inventor:
William B. Page
By Walter H. Chamberlin
Attorney

2 Sheets—Sheet 2.
W. B. PAGE.
PNEUMATIC TESTER FOR CANS.
No. 11,443. Reissued Sept. 25, 1894.
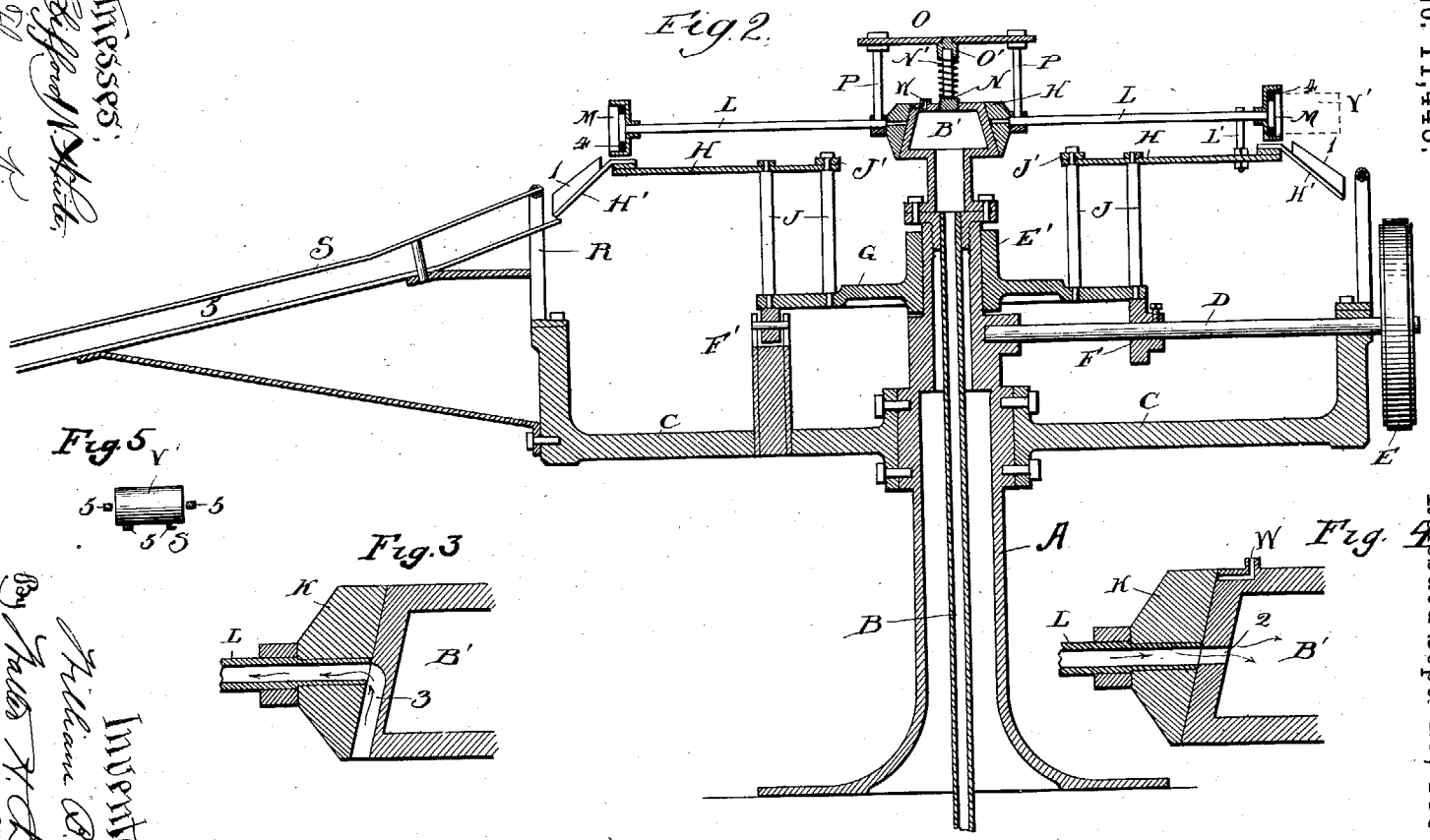
Witnesses:
Clifford N. White,
Florence King.
Inventor:
William B. Page
By Walter H. Chamberlin
Attorney.

UNITED STATES PATENT OFFICE.

WILLIAM B. PAGE, OF DIXON, ILLINOIS.

PNEUMATIC TESTER FOR CANS.

SPECIFICATION forming part of Reissued Letters Patent No. 11,443, dated September 25, 1894.

Original No. 469,302, dated February 23, 1892. Application for reissue filed July 26, 1893. Serial No. 481,579.

*To all whom it may concern:*

Be it known that I, WILLIAM B. PAGE, a citizen of the United States, residing at Dixon, in the county of Lee and State of Illinois, have invented certain new and useful Improvements in Pneumatic Testers for Tin Cans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to pneumatic testers for tin cans, and is intended to be employed in the process of manufacturing tin cans designed to be hermetically sealed to preserve the contents thereof, and it is also efficient as a means of testing the hermetical quality of cans at any time prior to their being filled.

My invention consists, first, in an annular series of horizontally rotating radial tubes provided at their outer ends with a cushioned seat in which the open end of the can is placed and having at one point in their rotation communication at their inner ends with the interior of a vacuum-chamber through a small opening in the wall of the latter and at a subsequent point in their rotation with the outside air. The aforesaid radial tubes successively register with the opening into the vacuum-chamber directly after the can is placed in its seat in the outer end of the tube, and such communication has the effect of instantly withdrawing the air from the tube and from the interior of the can and seating the latter upon its cushioned seat by the pressure of the outside air. In the onward rotation of the tube it passes the opening in the vacuum-chamber and its inner end fits closely against the smooth circular outside of said chamber, and no air can therefore be admitted within said tube except through a leakage in the can itself. Should there be such leakage, the admission through it of air into the can and tube will soon neutralize the pressure of the outside atmosphere and the can will drop from the tube by its own gravity. Should there be no leakage of air into the tube or can through a defect in the latter, the can will be suspended radially in the outer end of said tube nearly its entire revolution when the inner end of the tube will register with the aforesaid opening to the outer atmosphere, and the inrush of air through the inner end of the tube, neutralizing the outside atmosphere, will permit the can to be detached at once by its own gravity.

Another part of my invention consists in a revolving circular table extending beyond the outer ends of the aforesaid tubes and provided with a depressed margin having radial partitions on its upper surface and moving coincidently with said tubes and adapted to support and carry such of the cans as are proven defective to a certain opening and discharge said cans into a prepared chute. A further function of said partitions is to hold the cans deposited on said table in a radial position and to turn them transversely of said chute so that they may roll down the latter and be deposited in a convenient position for handling. So, also, said partitions are utilized to turn the perfect cans when dropped automatically transversely into the chute prepared for their reception so that they may pass down the latter and be deposited at the end thereof in like convenient relative position.

Another part of my invention is the supporting of the revolving structure consisting of the radial tubes and table aforesaid upon friction rollers and driving the same through the medium of one of said rollers so as to secure a uniform and non-pulsating rotation.

Another part of my invention is the supplementary support of the radial tubes aforesaid by a collar and arms suspended over the center of the vertical vacuum-chamber aforesaid so as to relieve the strain of the inner ends of said tubes upon the outer wall of said vacuum-chamber to prevent attrition of the inner ends of said tubes.

Another part of my invention is the provision of the duplex declining chutes for the discharge of the perfect and imperfect cans, respectively, and the relation of said chutes to the revolving table aforesaid, so as to automatically receive the cans in one uniform position.

I attain these objects by the mechanism illustrated by the accompanying drawings which form part of this specification, in which—

Figure 1 is a perspective plan view of my invention with a portion of the center cap removed to show the relation of the inner ends of the radial pneumatic tubes to the central vacuum-chamber. Fig. 2 is a central vertical section of Fig. 1. Figs. 3 and 4 are sectional detail views of the wall of the vacuum-chamber and of the collar surrounding it with the ends of the tubes secured thereto, and Fig. 5 is an end view of the chute with the can therein.

The same letters and figures refer to the same or similar parts throughout the several views.

A is a hollow metallic standard suitably broadened at the base and seated on or attached to the floor.

B is a vertical air tube seated within the hollow of the standard A and suitably connected through the floor or otherwise at its lower end to an air-exhausting pump. At its upper end the tube B is expanded into the annular vacuum-chamber B′, the latter having the form of the frustum of a cone.

C is the supporting frame of the machine, rigidly seated on and radially around the exterior of the standard A.

D is a rotating shaft suitably journaled at its inner end in the standard A and at its outer end in the outlying portion of the frame C. Outside of the frame C a belt-pulley E is keyed to the shaft D, by which through connection with suitable machinery rotation is imparted to the shaft D.

E′ is a metallic collar loosely seated on the exterior of the upper end of the standard A and adapted to be rotated thereon, said standard being cylindrical at that point for such purpose. Integral with the collar E′ is the horizontal annular plate G, which is supported near its outer edge at one side upon the friction wheel F, rigidly keyed to the shaft D, and by which said plate G is rotated. Plate G is sustained in equipoise by resting at its opposite side on the idle-pulley F′, the latter being suitably supported from the frame C.

H is an annular table suitably supported by the short standards J J on the annular plate G and carried thereby and suitably braced at its inner edge or central opening by the metallic ring J′. The outer edge of the table H is deflected downward, as shown in Fig. 2, to form a carrier H′ for such of the tin cans as through lack of being air tight drop from the ends of the radial pneumatic tubes aforesaid. On the upper surface of the declined edge or carrier H′ of the table H are radial partitions 1, which are curved upward from the table H and taper inwardly from their outer extremities, and serve to hold the imperfect cans radially and to assist in discharging all cans from said table.

K is a collar fitted closely to the outer surface of the vacuum-chamber B′. The pneumatic can tubes or arms L aforesaid have their inner ends projected horizontally through the walls of the collar K and in close contact with the outer wall of the vacuum-chamber B′ and are substantially supported and are carried by said collar K. The rotation of said arms L and said collar K is insured by the attachment of one or more of them near their outer ends to the table H by means of short connecting standards L′. An opening 2 is formed in a certain locality through the wall of the vacuum-chamber B′ at such altitude and of such size as to permit the inner end of each tube L at that point in its rotation to register with said opening 2. A vertical groove 3 is formed in the outer wall of the vacuum-chamber B′ which communicates at its lower end with the outside air and with which opening the inner ends of each of the tubes L successively register when said tubes have nearly completed their rotation after having been divested of their inclosed air through the opening 2, the rotation of the tubes L being in the direction of from the groove 3 to the opening 2. In the outer end of each of the tubes L is formed the annular vertical recess or can seat M sufficiently large to receive the open end of the can to be tested, and in the outer portion of such recess is placed the annular piece of rubber 4 which cushions the inner end of the can near its outer edge and precludes the entrance of the outside atmosphere into the can-seat M and tube L when the can is placed on said rubber.

N is a standard seated centrally on the vacuum-chamber B′, around which is placed the coiled spring N′. A transverse horizontal plate O is supported centrally upon the standard N by means of a collar O′ upon the under surface of the plate O, said collar passing down over the upper end of the standard N and resting on the upper end of said spring. Depending arms P are attached to the plate O near its outer end, and by suitable attachment at their lower ends to the tubes L assist in carrying the latter.

W is an oil-cup having suitable communication with the exterior of the chamber B for lubrication of the outer surface of the latter to facilitate the passage of the inner ends of the tubes L.

R is a stationary annular frame or wall projected upward from and supported by the frame C a slight distance outside the periphery of the table H and sufficiently above the periphery of the latter to retain on the declining portion of said table any cans that may casually drop thereon.

S is the chute for the exit of the imperfect cans and consists of four parallel rods 5, the two inner ones of which are somewhat lower than the two outer ones, and thereby forms a descending trough down which the cans roll by their own gravity. The outer rods 5 5 have the interval between them slightly greater than the length of the can, but not sufficient to permit the can to turn in the chute.

T is a chute or exit for the perfect cans and is constructed substantially as the chute S. Both of said chutes have communication with the table H at one edge thereof, a portion of the frame R being removed to permit such communication.

V′ represents the defective cans and V″ the perfect ones.

X is a table for the reception of the cans before testing, at the left of which the operator stands.

The operation of my invention is as follows:—The operator places a can V with the open end inward in a seat M, formed on the outer end of a pneumatic tube L in the interval while the inner end of said tube is passing from the air-orifice 3 to the vacuum-orifice 2, so timing the operation that the can will be held in said seat at the instant that the inner end of the tube L is registered with said suction-inlet 2. The effect of this communication with the vacuum-chamber B′ is to instantly cause the air in said tube L and can V, seated thereon to pass into said vacuum-chamber, and the suction created thereby holds the can in a horizontal position with its bottom extended radially from the tube in which position it is carried a greater or less portion of the way around over the table H, while the inner end of the tube L is passing around the unbroken exterior of said vacuum-chamber. Should there be no leakage in the can through which outside air can be admitted therein, said can will remain thus suspended until the tube L, bearing the same, shall have made nearly an entire revolution and until the inner end of said tube shall register with the air opening 3, when the vacuum in said can and tube will be destroyed by the inrushing air and said can will drop down against the rod 5′, forming the partition between the chutes S and T, in which position the next succeeding partition 1 of the carrier H′ will engage the inner edge of the can and, turning said can into the position shown in dotted lines in Fig. 1 of the drawings, or transversely of the chute T, discharge said can therein in said position. This is of great advantage as the cans can subsequently be handled with much greater facility and dispatch where they are delivered parallel with each other at the end of the chute T. Should any one of the cans after being seated, as aforesaid, on the end of the tube L and started on its revolution be imperfect and leak air, as soon as sufficient air has passed through such leak into the can the vacuum therein will be destroyed and said can will drop by its own gravity to the declining margin H′ of the table H, being held in a radial position thereon between the partitions 1 and with its base resting against and sliding along the inner surface of the frame R, being propelled by the next succeeding partition 1 until it reaches the mouth or inner end of the chute S, when it will be discharged down the latter in the same manner as described in reference to the discharge of perfect cans down chute T.

I have had several of my machines in operation and the operator becomes by practice very expert, so that the table H and tubes L may have a continuous rotation, and the operator can readily seat the cans on the outer ends of the tubes L as they successively approach the vacuum-opening 2, and a constant stream of perfect and imperfect cans be discharged down the chutes T and S.

The imperfect cans are all resoldered and submitted to subsequent test in the same machine. This operation is not only rapid and uniform, but its results are reliable, as the can is carried long enough and far enough to determine whether it will admit air and whether it is fit or unfit for hermetical canning.

What I claim as my invention, and desire to secure by Letters Patent of the United States, is—

1. In a can testing machine the combination of a chamber its wall provided with an opening communicating with a vacuum pipe and a second opening communicating with the atmosphere, a fitting revolving about said chamber and carrying a series of hollow radial arms adapted to engage the open ends of the cans to be tested, the inner ends of said arms alternately engaging the openings, substantially as described.

2. In a can testing machine the combination of a stationary vacuum-chamber its wall provided with an inlet opening, a series of radial tubes having can seats on their outer ends, the inner ends of said tubes having intermittent communication with the inlet opening of the vacuum chamber and with an opening to the exterior, air and means for revolving the tubes, substantially as described.

3. In a can testing machine the combination with a vacuum-chamber its wall provided with an inlet opening and another opening communicating with the exterior air, a series of radial horizontally revolving tubes provided on their outer ends with can seats, the inner ends of said tubes having direct intermittent communication with the openings in the vacuum chamber and means for rotating the arms, substantially as described.

4. The combination of a vacuum-chamber B′ its wall provided with the opening 2 and the opening 3, and a series of horizontal radial pneumatic tubes L provided with can seats M at their outer extremities and their inner ends abutting against the exterior of said chamber B′ and having intermittent communication with said openings 2 and 3, and means, substantially as shown for imparting rotation to said arms, substantially as shown and for the purpose described.

5. The combination of the vacuum chamber B′ its wall provided with openings 2 and 3 radial tubes L provided with can seats M at their outer ends, respectively, and seated with their inner ends abutting against the exterior of said vacuum-chamber and adapted to intermittingly register with said openings 2 and 3, the table H provided with declining margin H′ and partitions 1 seated rigidly thereon, and means, substantially as shown, for imparting rotation to said table and tubes, substantially as shown, and for the purpose described.

6. The combination of the standard A, frame C affixed thereto, shaft D suitably journaled on frame C and provided with driving pulley E, friction driving pulley F rigidly seated on said shaft, supporting pulley F′, suitably supported on frame C, plate G, carried upon said pulleys and loosely collared upon standard A, vacuum chamber B′, its wall provided with openings 2 and 3, vacuum-tube B, table H, supported upon plate G, and radial tubes L provided at their outer ends with cup seats M and abutting at their inner ends against the exterior of chamber B′ and adapted to intermittingly register at the openings 2 and 3, respectively, central post N, plate O, and arms P P, suitably attached intermediately to tubes L, substantially as shown and for the purpose described.

7. In a can testing machine the combination of a suitable supporting rotating table H having a declining margin H′ provided with partitions 1, a circular series of radial vacuum-tubes L suitably supported above said table and provided with can seats M at their outer ends, a central vacuum-chamber B′, adapted to have intermittent communication with the inner end of the tubes L, a suitable releasing air-inlet for said tubes, retaining frame R seated around the periphery of said table can discharging chutes S and T, communicating, respectively, with the periphery of said table, and means, substantially as shown, for rotating said table and tubes, substantially as shown and for the purpose described.

8. The combination of a centrally situated vacuum-chamber B′ provided with an opening 2, a horizontal circular table H seated around and below said chamber, an annular series of radial tubes L adapted on their outer ends to receive the tin cans and abutting at their inner ends against the wall of said vacuum chamber and intermittingly registering with said opening 2, an air-duct 3 in the wall of the vacuum chamber, means, substantially as shown, for rotating said table and tubes, and means, substantially as shown for supporting and discharging the perfect and imperfect cans, substantially as shown, and for the purpose described.

9. In a pneumatic can tester, the combination with a horizontally-revolving table a series of seats each adapted to receive the open end of the can to be tested and a margin projecting from the edge of the table, provided with partitions, of means for exhausting air from and admitting it to the seats, chutes leading from the outer edge of the margin of the table, and a partition between said chutes, substantially as described.

In witness whereof I affix my signature hereto in the presence of two witnesses.

WILLIAM B. PAGE.

Witnesses:
ALBERT R. ASHLEY,
WILLIAM MCBRIDE.